(12) United States Patent
Stoutamire et al.

(10) Patent No.: US 8,650,203 B1
(45) Date of Patent: *Feb. 11, 2014

(54) ITERATED RELATED ITEM DISCOVERY

(75) Inventors: David P. Stoutamire, Redwood City, CA (US); Yoshiki Hayashi, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/228,682

(22) Filed: Sep. 9, 2011

Related U.S. Application Data

(63) Continuation of application No. 12/032,515, filed on Feb. 15, 2008, now Pat. No. 8,078,632.

(51) Int. Cl.
*G06F 17/30* (2006.01)
(52) U.S. Cl.
USPC ............................... 707/759; 707/769
(58) Field of Classification Search
USPC ................................. 707/759, 769
See application file for complete search history.

(56) References Cited

U.S. PATENT DOCUMENTS

| | | | |
|---|---|---|---|
| 7,856,429 B2 * | 12/2010 | Herberger et al. | 707/705 |
| 2005/0102282 A1 * | 5/2005 | Linden | 707/3 |
| 2007/0214488 A1 * | 9/2007 | Nguyen et al. | 725/134 |
| 2007/0260591 A1 * | 11/2007 | Ahi et al. | 707/3 |
| 2009/0204609 A1 * | 8/2009 | Labrou et al. | 707/5 |

\* cited by examiner

*Primary Examiner* — Hung Q Pham
(74) *Attorney, Agent, or Firm* — Fenwick & West LLP

(57) ABSTRACT

The present invention provides methods and computer program products for identifying a set of related videos for a first video. An embodiment of the method comprises a video hosting website creating an ordered list containing a plurality of words from the metadata associated with the first video. The video hosting website uses a select number of words from the ordered list to form a search query. The search query is processed by the videos hosting website to obtain search results that contain a number of related videos. If the number of related videos in the search results is not within a set range, the search query is modified and the modified search query is processed. If the number of related videos in the search results is within a set range, the search results are provided as the set of related videos for the first video.

30 Claims, 4 Drawing Sheets

ITERATED RELATED ITEM DISCOVERY

CROSS-REFERENCE TO RELATED APPLICATION

This application is a continuation of U.S. patent application Ser. No. 12/032,515, filed Feb. 15, 2008, which is incorporated by reference herein in its entirety.

BACKGROUND OF THE INVENTION

1. Field of the Invention

This invention pertains in general to identifying videos that are related to a specific video.

2. Description of the Related Art

Video hosting websites allow users to discover videos that are available over the Internet. A user is able to discover videos of interest by submitting a search query to the video hosting website or by browsing in the different categories of the video searching website. Once a user finds a video of interest and selects a link to the video, the link directs the user to a webpage where the video or details of the video may be viewed. For example, the video hosting website may allow a user to search and view videos contained within the video hosting website, or videos located or, or sourced from other websites. Along with the content of a selected video, some video hosting websites display multiple links to videos that are related to the video the user has selected. The links to the related videos make other videos that may be of interest to the user easily accessible.

In conventional methods, the related videos are determined using keywords from an initial search query, or based upon which videos or authors are popular. While the conventional methods can identify and present videos as being relevant to a video selected by a user, many times the identified relevant videos do not contain material the user is interested in.

BRIEF SUMMARY OF THE INVENTION

The present invention provides methods and computer program products for identifying a set of related videos for a first video. An embodiment of the method comprises a video hosting website creating an ordered list containing a plurality of words from the metadata associated with the first video. Examples of the metadata associated with the first video could be the title, description, and tag information. The video hosting website uses a select number of words from the ordered list to form a search query.

The search query is processed by the videos hosting website to obtain search results that contain a number of related videos. If the number of related videos in the search results is not within a set range, the search query is modified and the modified search query is processed. For example, the search query may be modified by adding or subtracting one or more words from the search query. The actions of modifying the search query and processing the modified search query continue until the number of related videos in the search results is within a set range. Once the number of related videos in the search results is within a set range, the search results are provided as the set of related videos for the first video. For example, the search results may be presented to a user along with the first video.

The features and advantages described in this summary and the following detailed description are not all-inclusive. Many additional features and advantages will be apparent to one of ordinary skill in the art in view of the drawings, specification, and claims hereof.

The figures depict various embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. Overview

Figure 1:
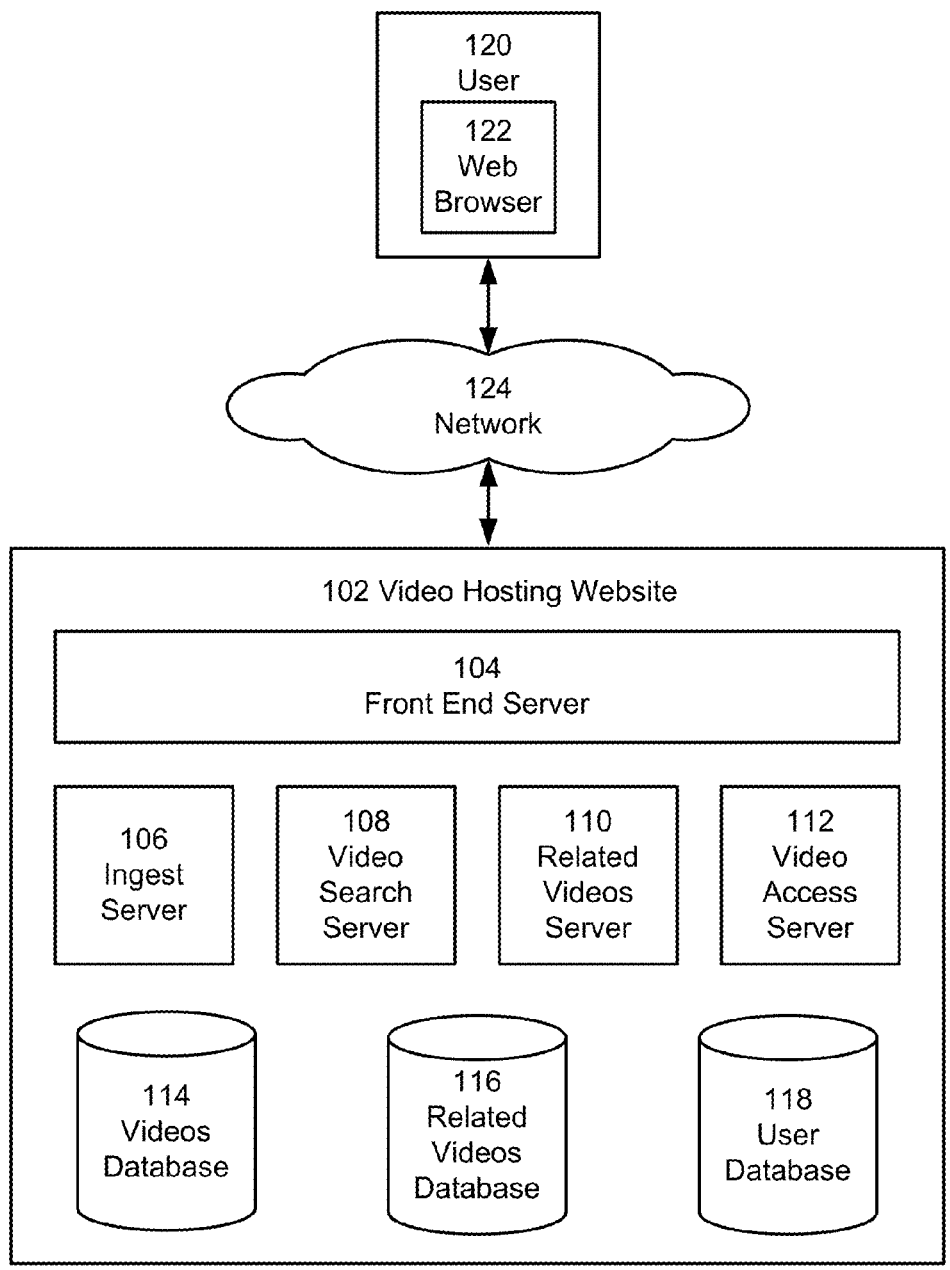
FIG. 1 is a high-level block diagram of the environment and system architecture of a video hosting website according to one embodiment.

FIG. 1 is a high-level block diagram of the environment 100 and system architecture of a video hosting website 102 according to one embodiment. FIG. 1 illustrates a video hosting website 102 and a user connected by a network 124. The user represents an entity that can access videos contained within the video hosting website 102. A user can access a video from the video hosting website 102 by browsing a catalog of videos, conducting searches using keywords, reviewing play lists from other users or the system administrator (e.g., collections of videos forming channels), or viewing videos associated with particular user groups (e.g., communities). Additionally, in some embodiments, the video hosting website 102 is adapted to receive videos for storage in order to enable the sharing of the videos with other users.

In one embodiment, the user uses a computer system to communicate with the video hosting website 102 over the network 124. In one embodiment, the computer system is a personal computer executing a web browser 122 such as MICROSOFT INTERNET EXPLORER or MOZILLA FIREFOX that allows the user to view webpages and videos provided by the video hosting website 102. In one embodiment, the web browser 122 includes a video player (e.g., Flash™ from Adobe Systems, Inc.). The user may utilize a network-capable device other than a computer system, such as a personal digital assistant (PDA), a cellular telephone, a pager, a television "set-top box" etc. Although FIG. 1 illustrates only a single user, it should be understood that many (e.g., millions) users can communicate with the website at any time. The single user is illustrated in order to simplify and clarify the present description.

The network 124 represents the communication pathways between the user and the video hosting website 102. In one embodiment, the network 124 is the Internet, but may also be any network, including but not limited to a LAN, a MAN, a WAN, a mobile, wired or wireless network, a private network, or a virtual private network, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Most generally, the video hosting website 102 represents any system that allows users to access video content via searching and/or browsing interfaces. The sources of videos can be from user uploads of videos, searches or crawls of other websites or databases of videos, or the like, or any combination thereof. For example, in one embodiment a video hosting site 102 can be configured to allow for user uploads of content; in another embodiment a video hosting website 102 can be configured to only obtain videos from other sources by crawling such sources or searching such sources in real time.

To simplify and clarify the present description, the content received and shared by the video hosting website 102 will be referred to as videos, video files, or video items, but it should be understood that the website 102 can receive and share content of any media type and file type. Thus, the operations described herein for identifying related items can be applied to any type of content, not only videos; other suitable type of content items include audio files (e.g. music, podcasts, audio books, and the like), documents, multimedia presentations, and so forth. In addition, related items need not be of the same type. Thus, given a video, the related items may include one or more audio files, documents, and so forth in addition to other videos. A suitable video hosting website 102 for implementation of the system is the YOUTUBE™ website; other video hosting websites are known as well, and can be adapted to operate according to the teaching disclosed herein. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The video hosting website 102 comprises a front end server 104, an ingest server 106, a video search server 108, a related videos server 110, a video access server 112, a videos database 114, a related videos database 116, and a user database 118. Many conventional features, such as firewalls, load balancers, application servers, failover servers, site management tools and so forth are not shown so as not to obscure the features of the system.

Each of the various servers is implemented as a server program executing on a server-class computer comprising a CPU, memory, network interface, peripheral interfaces, and other well known components. The computers themselves preferably run an open-source operating system such as LINUX, have generally high performance CPUs, 1G or more of memory, and 100G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media).

The front end server handles all communication with the user via the network 124. The front end server receives requests from users and communicates with the other servers of the website 102 in order to process the requests. Any content received via the network 124 from a user for posting to the website 102 is passed on to the ingest server 106 for processing. The processing of the video file includes assigning an identification number to the newly received video file. Other steps of processing the video file may include formatting (e.g., transcoding), compressing, metadata tagging, content analysis, and/or other data processing methods. The user transmits a form along with the video file transmitted to the website 102. The user may include in the form information that describes the video (e.g., title, description, and tag information). The ingest server 106 stores the processed video file in a video database 114 and stores the information included in the form as metadata of the video file.

The video database 114 is the storage system where the video files transmitted to the website 102 are stored. Additionally, the ingest server 106 updates the data contained on the user that transmitted the video file to the website in a user database 118. In one embodiment, the ingest server 106 stores the identification number assigned to the stored video file with the data of the respective user in user database 118. The user database 118 contains data on all of the users that communicate with the website 102. An example of data contained in the user database 118 for a specific user includes the identification numbers of all video files transmitted by the user to the website 102 and the identification numbers of all video files that the user has accessed from the video database 114 and viewed. In one embodiment, users are identified using a login name and password and/or by using the user's internet protocol address.

The video search server 108 processes any search query received by the front end server 104 from a user. The search query transmitted by the user to the front end server 104 includes search criteria, such as keywords that may identify videos the user is interested in viewing. The video search server 108 uses the search criteria to query the metadata of all video files stored in the videos database 114. The search results from the query are transmitted to the front end server 104, so that the search results can be presented to the user.

Figure 2:
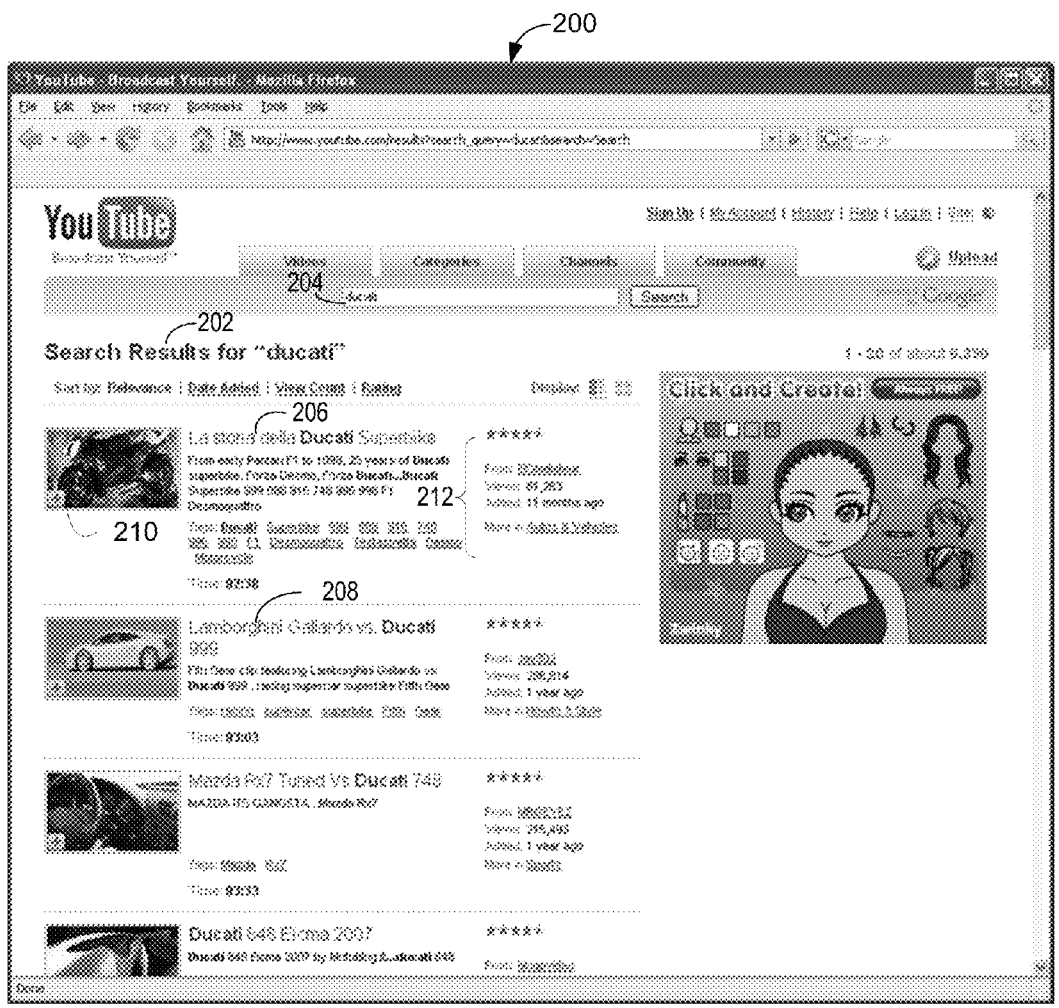
FIG. 2 is an example of a webpage showing search results based on a keyword search for "ducati" according to one embodiment.

For example, if a user provides the front end server 104 with a keyword search query with the word "ducati" the video search server 108 identifies all videos stored in the videos database 114 related to the word "ducati." The search results are provided to the user on a webpage (and/or as another representation). FIG. 2 is an example of a webpage 200 showing search results 202 based on a keyword search for "ducati" 204 according to one embodiment. In this example, the first two videos in the search results are videos 206 and 208. Video 206 includes the title of the video, "La storia della Ducati Superbike" and below the title is a brief summary of the video. Image 210 allows the user to see a sample image of the content of video 206. Section 212 shows additional information about video 206, such as when the video was transmitted to the website 102, the number of users that have viewed video 206, and the login name of the user that transmitted the video 206 to the website 102. Image 210 and the title of video 206 are links that direct the user to a webpage where video 206 can be viewed.

The related videos server 110 determines videos that will be displayed as being related videos for a specific video. The related videos for a specific video may be determined when the specific video is first transmitted to the website by a user and/or when the specific video is requested for viewing by a user. For example if a user is viewing a video on a specific exotic Italian car (e.g., Lamborghini Murcielago), the related videos server 110 determines other videos contained within the videos database 114 that are related to the exotic Italian car. The related videos server 110 determines the videos to be displayed as being related to a specific video by generating an ordered list of words. The related videos server 110 generates the ordered list of words by scanning the metadata of the specific video, such as the title, description, and tags of the video.

In one embodiment, all of the words in the metadata are included in the list. The ranking of the words is a function of the frequency of the words in the metadata. This function of frequency can be implemented in various ways. In one embodiment, the words are ordered according to their raw frequency of occurrence in the metadata. Alternatively, the words can be ordered according to a normalized frequency, such as a TF-IDF value, or other weighted measures. In one embodiment, once the related videos server 110 generates an ordered list of words, the related videos server 110 additionally revises the list. Some ways in which the ordered list is revised may be by spell checking each individual word, stemming words, including in the list synonyms for words, and removing inappropriate words (e.g., curse words) or unnecessary words (e.g., stop words). Of course, the related videos server 110 can simply implement these rules as the metadata is being scanned, rather than afterwards.

In one embodiment, the ordered list is revised based on stored data of the user that transmitted the specific video to the website 102 and/or a user that will view the specific video. The stored data represents a word frequency profile for a user, based on the videos viewed by the user. The word frequency profile for a user represents the frequency of different words as they appear in the metadata of the videos viewed by the user, and/or metadata of videos uploaded by the user, or a combination thereof. The frequency profile can be based on raw frequency information, or normalized frequency information, such as a TF-IDF score, which can be either a general (corpus wide) TF-IDF score based on the metadata of all videos in the video database, or a user-specific TF-IDF score based on just those videos viewed and/or uploaded by the user. The word frequency profile used for revising the ordered list is contained in the user database 190. In one embodiment, the ordered list is revised by modifying the ranking of each word therein using the word frequency profile of the user. For example, the related videos server 110 generates an ordered list of words for a video about cars. In the list the highest ranking word is "car" and a much lower ranking word in the list is "race." The related video server 110 examines the word frequency profile of the user that has requested to view the video; the profile may show for example, that the term "race" occurs more frequently (high rank) than the term "car". Based on the information the related videos server 110 makes the word "race" a high ranking word in the ordered list and leaves the word "car" as a high ranking word. The ordered list can also be modified by including one or more words from the user's word frequency profile in the ordered list (e.g., including the three highest ranked words in the profile).

Once the ordered list is generated and revised, the related videos server 110 selects one or more of the highest ranking words (e.g., first 4 words from the ordered list) and includes the selected words in a search query. The search query is processed by the video search server 108 and the search results are transmitted to the related videos server 110. The related video server 110 uses a number of strategies to obtain a number of search results within a desired range, for example between 15 and 30 videos. For example, if the number of videos in the search results are below a first threshold (e.g. less than 15 videos), the related videos server 110 removes the lowest ranking word from the search query and the search query is once again processed by the video search server 108. For example, reducing the number of terms from 4 words to 3 in the query broadens the query and should result in a larger number of search results. Alternatively if the number of videos in the search results is above a second threshold (e.g., more than 30 videos), the related videos server 110 adds the next highest ranking word from the ordered list to the search query, which is transmitted to the video search server 108 for processing. Increasing the number of words in the query should result in a smaller number of search results. The process of the related videos server 110 adding or removing words to a search query continues until the amount of videos in the search results is within the desired range. Other strategies may also be used, such as binary searches.

In one embodiment, the search processing can be implemented using multiple parallel searches, each operating over a subset of the database 114, the results of which are combined. The parallel searches may also recursively form a tree. At each level of the tree independent decisions are made as to how many words to keep in a search query while still returning search results that are within the desired results. By making independent decisions at each level of the tree, quality search results are still provided while avoiding the latency of multiple searches up and down the tree.

Once the number of related videos in the search results is within the desired range, these are displayed in conjunction with the video for which the ordered list was generated. In one embodiment, the search query that generated the search results within the desired range and/or the search results are stored by the related videos server 110 in a related videos database 116 along with the identification number of the video for which the ordered list was generated; this allows a faster execution of the search so as to yield updated results, but with a high likelihood of being within the desired range of results, or very close thereto, thereby reducing the number of revised searches that need to be executed. The related videos database 116 contains a list of identification numbers for different videos stored in the videos database 114. For each identification number the related videos database 116 contains a search query that generates search results of related videos within the proper range and/or contains identification numbers of videos that will be displayed as being related videos. In one embodiment, if the related videos are determined dynamically at the time a video is requested, the search results are transmitted to the video access server 112.

In another embodiment, once the related videos server 110 generates and revises an ordered list of words for a specific video, the related videos server 110 includes all of the words from the list in a search query which is processed by the video search server 108. The related videos server 110 receives the results. If the number of videos in the search results is less than a set threshold, the lowest ranking word is removed from the search query and the search query is processed. The process of removing the lowest ranking word from the search query continues until the number of videos in the search results is within a desired range. Although, the related video server 110 is described as only including words in the ordered list and in search queries, in other embodiments other entities may be included in the list and in search queries. For example, the ordered list and search queries could include phrases, bigrams, synonymous concepts, or other human language abstractions.

Turning now to the operation of the system from the user perspective, the video access server 112 receives from the front end server requests from users that wish to view a specific video. In one embodiment, a user may execute a request by browsing the different categories of the website 102 or by clicking on a link to a video from a search results webpage. The request transmitted by the user can include the identification number of the video the user wishes to view (this can be included automatically once the user clicks on the link for the video). The video access server 112 uses the identification number to search and locate where the video is stored in the videos database 114. Once the video has been found, the video access server 112 determines the related videos for the selected video.

The video access server 112 may determine the related videos for the selected video using one of three methods. The methods include using a stored search query, using stored identification numbers of related videos and/, dynamically determining the related videos when the related video is requested.

In one embodiment, the video access server 112 determines the related videos to include with the requested video by retrieving from the related videos database 116 a search query stored with the respective identification number of the requested video. The video access server 112 transmits the stored search query to the video search server 108 for processing. The video access server 112 receives the search results and identifies the videos in the search results as videos to display as related videos with the requested video.

Alternatively, the video access server 112 determines the related videos to include with the requested video by retrieving from the related videos database 116 a set of identification numbers of related videos stored with the respective identification number of the requested video. Using the identification numbers, the video access server 112 displays the related videos with the requested video.

In both of the foregoing embodiments, the stored information (search query or identification numbers) can be maintained for some period of time, and then periodically updated (e.g. weekly).

In another embodiment, as noted above, the related videos are determined dynamically at the time of the request, meaning that the video access server 112 determines the related videos to include with the requested video by providing the identification number of the requested video to the related videos server. The related videos server 110 uses the identification number to generate an order list of words and produces search results that are within a desired range. The video access server 112 receives the search results and identifies the videos in the search results as the videos related to the requested video The video access server 112 provides the video requested to the front end server 104 along with links to related videos identified for the requested video. In addition, the links may be accompanied by icons or thumbnails views of each related video, along with associated metadata, such as title, author, tags and rating. The front end server 104 transmits and presents the requested video and related video links to the user on a webpage. The requested video is streamed by the front end server 104 to the user. A related video link appearing on the webpage where the requested video is playing can be selected in order to view the related video.

Figure 3:
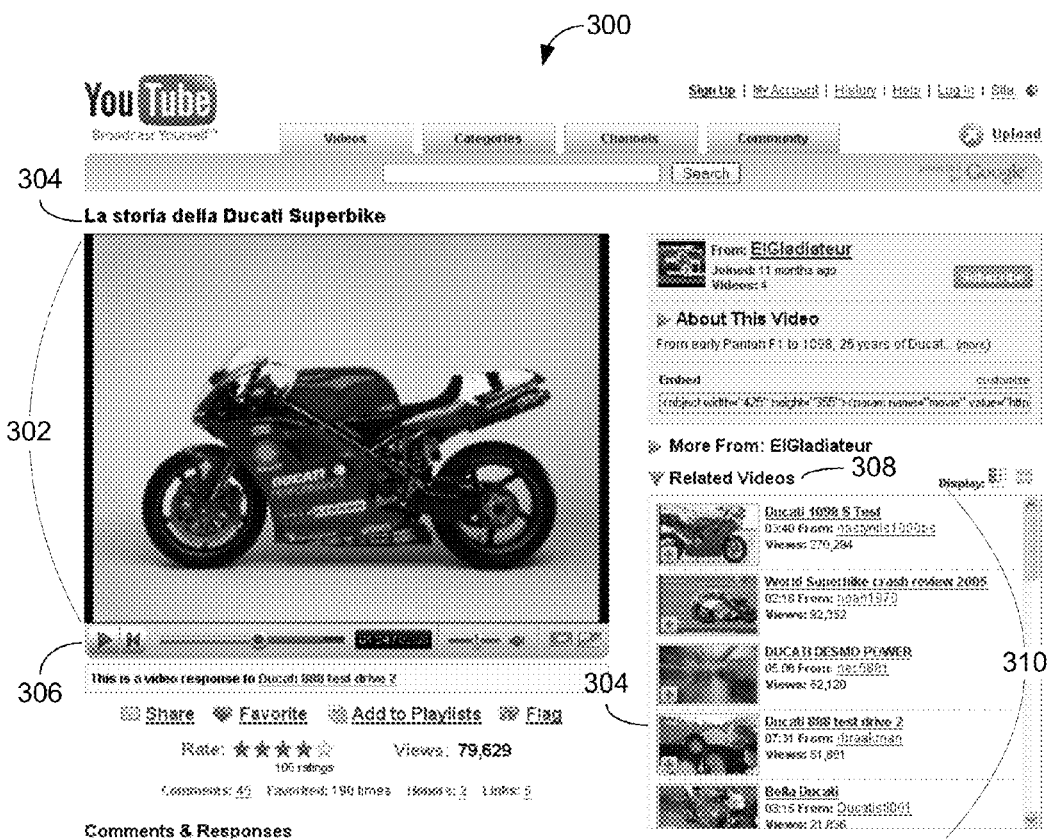
FIG. 3 is an example of a webpage playing the video with the title of "La storia della Ducati Superbike" according to one embodiment.

For example, if a user provides the front end server 104 with a request for a specific video with the title of "La storia della Ducati Superbike", the front end server 104 will present the requested video to the user along with links to related videos on a webpage. FIG. 3 is an example of a webpage 300 playing the video 302 with the title of "La storia della Ducati Superbike" 304 according to one embodiment. The webpage 300 contains controls 306 that allow a user to control how and when the video 302 is played. To the right of the video 302 is a related videos box 308, which contains links to videos 310 that the website has determined to display as being related to video 302. If a user selects a link of a related video, the related video selected is played on a webpage.

Figure 4:
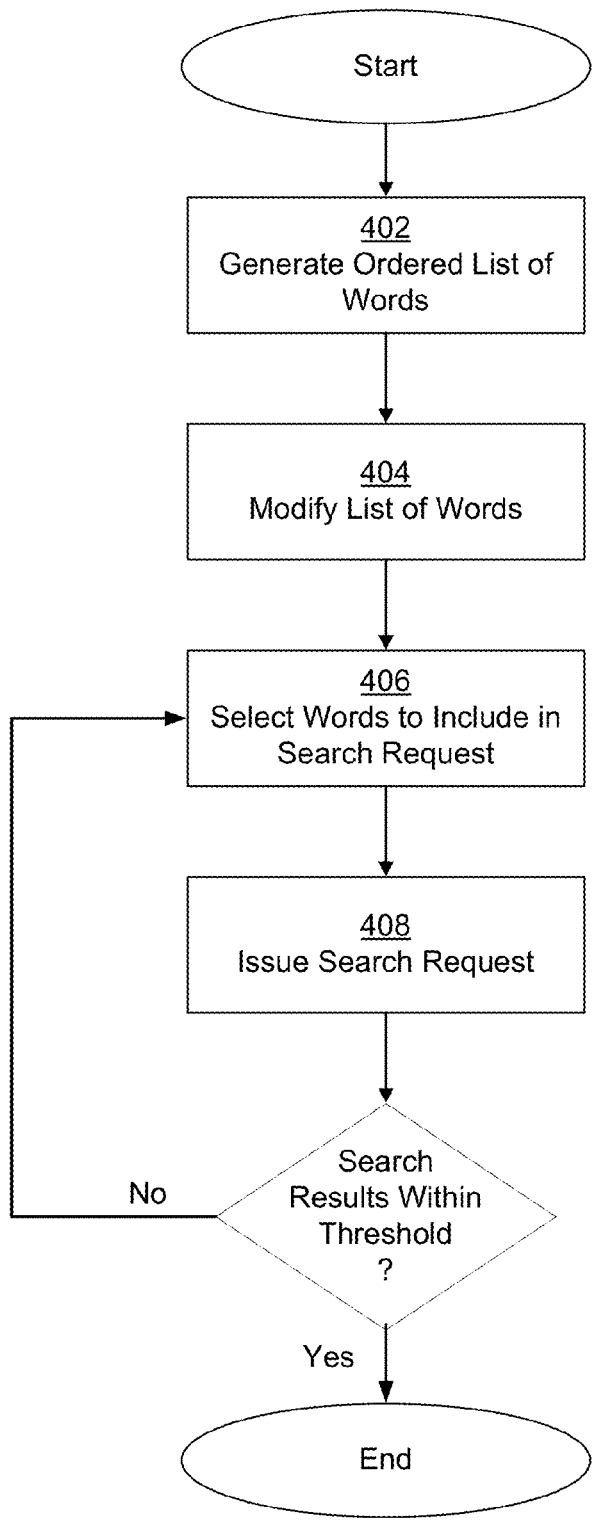
FIG. 4 is a flow chart illustrating the operations of the video hosting website in identifying videos to display as related videos for a specific video according to one embodiment.

FIG. 4 is a flow chart illustrating the operations of the video hosting website 102 in identifying videos to display as related videos for a specific video according to one embodiment. Those of skill in the art will recognize that other embodiments can perform the steps of FIG. 4 in different orders. Moreover, other embodiments can include different and/or additional steps than the ones described here. In one embodiment, the steps of FIG. 4 are performed by one more executable programs that are part of the video hosting website 102 in response to the video being uploaded to the website 102 for storage. In another embodiment, the steps of FIG. 4 are performed by the video hosting website 102 in response to a user request to view the specific video stored on the website 102.

The website 102 generates 402 an ordered list of words for the specific video by scanning the metadata (e.g., title, summary, tags) of the video. In one embodiment, the words that appear the most frequently in the metadata are ranked higher in the ordered list. The generated ordered list is modified 404 according specifications by a system administrator. It should be understood that once the order list is generated, modification of the list is optional and not required in order to identify videos that are related to the specific video.

A specific number of words are selected 406 by the website 102 from the ordered list to be included in a search query (e.g., first four words from the list). The search query is issued 408 and the videos stored within the website 102 are queried according to the words included in the search query. Search results are generated based on the query of the stored videos. The search results include a list of videos that contain in their respective metadata the selected words included in the search query.

The website 102 examines the search results to determine if the number of videos included in the search results is within a set threshold. In one embodiment, the threshold is set by a system administrator. If the search results are not within the set threshold, the website 102 once again selects words from the ordered list to include in a search query. If the number of videos in the search results is above the set threshold, it signifies that search query was too broad. A new more narrow search query is constructed by including the words from the previous search query plus the next highest ranked word from the ordered list Alternatively, if the number of videos in the search results was below the set threshold, it signifies that search query was to narrow. To broaden the search a new search query is constructed that includes the same words from the previous search query minus one word. The word removed from the search query is whichever word was ranked lowest in the ordered list of words. The new search query is one again issued and search results are generated.

If the search results are within the set threshold, the videos included in the search results are the related videos to the specific video. In one embodiment, the search results and/or the search query that generated the search results are stored by the website 102. The stored information is used to identify the related videos to display next time a user requests the specific video. In another embodiment, the website 102 presents the search results to a user as related videos to the specific video.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer implemented method for identifying a set of videos related to an additional video, the method comprising:
    maintaining, by a hosting system, a profile for a user, the profile including a first plurality of words included in metadata associated with a plurality of videos previously presented to the user, each of the first plurality of words associated with a frequency that the word appears in the metadata associated with the plurality of videos;
    creating, by the hosting system, an ordered list comprising a second plurality of words that are ranked, the second plurality of words included in metadata associated with the additional video;
    receiving, by the hosting system from a device, a request by the user to view the additional video;
    responsive to receiving the request, modifying, by the hosting system, the ranking of the second plurality of words based on the profile;
    responsive to modifying the ranking, forming, by the hosting system, a search query that includes a number of words selected from the ordered list;
    processing, by the hosting system, the search query to obtain a first set of related videos;
    responsive to a number of related videos in the first set being less than a first threshold, modifying, by the hosting system, the search query by removing at least one word from the search query without replacing the removed word, and processing the modified search query to obtain a second set of related videos; and
    responsive to the number of related videos in the first set being greater than the first threshold, providing, by the hosting system to the device, the first set as the related videos for the additional video.

2. The computer implemented method of claim 1, wherein the selected words are selected based on being ranked the highest among the second plurality of words.

3. The computer implemented method of claim 1, further comprising:
    adding at least one word from the first plurality of words to the ordered list.

4. The computer implemented method of claim 1, further comprising:
    responsive to the number of related videos in the first set exceeding a second threshold, modifying the search query by adding at least one word from the ordered list to the search query and processing the modified search query.

5. The computer implemented method of claim 1, wherein providing the first set further comprises providing to the device for display a list of the videos included in the first set.

6. The computer implemented method of claim 1, wherein providing the first set further comprises storing information indicating that the first set are the related videos for the additional video.

7. The computer implemented method of claim 1, wherein providing the first set further comprises storing the search query in a data store in conjunction with the first video.

8. A computer program product, comprising a non-transitory computer readable storage medium having computer program instructions and data embodied thereon for identifying a set of videos related to an additional video, the computer program instructions and data to adapt a processor to perform operations comprising:
  maintaining a profile for a user, the profile including a first plurality of words included in metadata associated with a plurality of videos previously presented to the user, each of the first plurality of words associated with a frequency that the word appears in the metadata associated with the plurality of videos;
  creating an ordered list comprising a second plurality of words that are ranked, the second plurality of words included in metadata associated with the additional video;
  receiving a request by the user to view the additional video;
  responsive to receiving the request, modifying the ranking of the second plurality of words based on the profile;
  responsive to modifying the ranking, forming a search query that includes a number of words selected from the ordered list, each selected word selected based on the associated ranking;
  processing the search query to obtain a first set of related videos;
  responsive to a number of related videos in the first set being less than a first threshold, modifying the search query by removing at least one word from the search query without replacing the removed word, and processing the modified search query to obtain a second set of related videos; and
  responsive to the number of related videos in the first set being greater than the first threshold, providing the first set as the related videos for the additional video.

9. The computer program product of claim 8, wherein the selected words are selected based on being ranked the highest among the second plurality of words.

10. The computer program product of claim 8, further comprising:
  adding at least one word from the first plurality of words to the ordered list.

11. The computer program product of claim 8, the computer program instructions and data to further adapt the processor to perform operations:
  responsive to the number of related videos in the first set exceeding a second threshold, modifying the search query by adding at least one word from the ordered list to the search query and processing the modified search query.

12. The computer program product of claim 8, wherein providing the first set further comprises providing to a device for display a list of the videos included in the first set.

13. The computer program product of claim 8, wherein providing the first set further comprises storing information indicating that the first set are the of related videos for the additional video.

14. The computer program product of claim 8, wherein providing the first set further comprises storing the search query in a data store in conjunction with the first video.

15. A computer implemented method for identifying a set of content items related to an additional content item, the method comprising:
  maintaining, by a hosting system, a profile for a user, the profile including a first plurality of words included in metadata associated with a plurality of content items previously presented to the user, each of the first plurality of words associated with a frequency that the word appears in the metadata associated with the plurality of content items;
  creating, by the hosting system, an ordered list comprising a second plurality of words that are ranked, the second plurality of words included in metadata associated with the additional content item;
  receiving, by the hosting system from a device, a request by the user to access the additional content item;
  responsive to receiving the request, modifying, by the hosting system, the ranking of the second plurality of words based on the profile;
  responsive to modifying the ranking, forming, by the hosting system, a search query that includes a number of words selected from the ordered list, each selected word selected based on the associated ranking;
  processing, by the hosting system, the search query to obtain a first set of related content items;
  responsive to a number of content items in the first set being less than a first threshold, modifying, by the hosting system, the search query by removing at least one word from the search query without replacing the removed word, and processing the modified search query to obtain a second set of related content items; and
  responsive to the number of related content items in the first set being greater than the first threshold, providing, by the hosting system to the device, the first set as the related content items for the additional content item.

16. The computer implemented method of claim 15, wherein the selected words are selected based on being ranked the highest among the second plurality of words.

17. The computer implemented method of claim 15, further comprising:
  adding at least one word from the first plurality of words to the ordered list.

18. The computer implemented method of claim 15, further comprising:
  responsive to the number of content items in the first set exceeding a second threshold, modifying the search query by adding at least one word from the ordered list to the search query and processing the modified search query.

19. The computer implemented method of claim 15, wherein providing the first set further comprises providing to the device for display a list of the content items included in the second set.

20. The computer implemented method of claim 15, wherein providing the first set further comprises storing information indicating that the first set are the related videos for the additional content item.

21. The computer implemented method of claim 15, wherein providing the first set further comprises storing the search query in a data store in conjunction with the first content item.

22. A computer program product, comprising a computer readable storage medium having computer program instructions and data embodied thereon for identifying a set of content items related to an additional content item, the computer program instructions and data to adapt a processor to perform the operations of:

maintaining a profile for a user, the profile including a first plurality of words included in metadata associated with a plurality of content items previously presented to the user, each of the first plurality of words associated with a frequency that the word appears in the metadata associated with the plurality of content items;

creating an ordered list comprising a second plurality of words that are ranked, the second plurality of words included in metadata associated with the additional content item;

receiving a request by the user to access the additional content item;

responsive to receiving the request, modifying the ranking of the second plurality of words based on the profile;

responsive to modifying the ranking, forming a search query that includes a number of words selected from the ordered list, each selected word selected based on the associated ranking;

processing the search query to obtain a first set of related content items;

responsive to a number of content items in the first set being less than a first threshold, modifying the search query by removing at least one word from the search query without replacing the removed word, and processing the modified search query to obtain a second set of related content items; and responsive to the number of related content items in the first set being greater than the first threshold, providing the first set as the related content items for the additional content item.

23. The computer program product of claim 22, wherein the selected words are selected based on being ranked the highest among the second plurality of words.

24. The computer program product of claim 22, further comprising:
adding at least one word from the first plurality of words to the ordered list.

25. The computer program product of claim 22, the computer program instructions and data to further adapt the processor to perform operations:
responsive to the number of content items in the first set exceeding a second threshold, modifying the search query by adding at least one word from the ordered list to the search query and processing the modified search query.

26. The computer program product of claim 22, wherein providing the first set further comprises providing to a device for display a list of the content items included in the second set.

27. The computer program product of claim 22, wherein providing the first set further comprises storing information indicating that the first set are the related videos for the additional content item.

28. The computer program product of claim 22, wherein providing the first set further comprises storing the search query in a data store in conjunction with the first content item.

29. A computer implemented method for identifying a set of videos related to an additional video, the method comprising:
maintaining, by a hosting system, a profile for a user, the profile including a first plurality of words included in metadata associated with a plurality of videos previously presented to the user, each of the first plurality of words associated with a frequency that the word appears in the metadata associated with the plurality of videos;

creating, by the hosting system, an ordered list comprising a second plurality of words that are ranked, the second plurality of words included in metadata associated with the additional video;

receiving, by the hosting system from a device, a request by the user to view the additional video;

responsive to receiving the request, modifying, by the hosting system, the ranking of the second plurality of words based on the profile;

responsive to modifying the ranking, forming, by the hosting system, a search query that includes a number of words selected from the ordered list, each selected word selected based on the associated ranking;

processing, by the hosting system, the search query to obtain a first set of related videos;

responsive to a number of related videos in the first set being less than a first threshold, modifying, by the hosting system, the search query by removing at least one word from the search query without replacing the removed word, and processing the modified search query to obtain a second set of related videos; and responsive to a number of related videos in the second set being greater than the first threshold, providing, by the hosting system to the device, the second set as the related videos for the additional video.

30. A computer implemented method for identifying a set of videos related to an additional video, the method comprising:
maintaining, by a hosting system for a user, a word frequency profile including a first plurality of words included in metadata associated with a plurality of videos previously presented to the user, each of the first plurality of words associated with a frequency that the word appears in the metadata associated with the plurality of videos;

transmitting, by the hosting system to a computer system, the additional video for presentation to the user;

identifying, by the hosting system, a list created for the additional video, the list comprising a second plurality of words that are ranked, the second plurality of words included in metadata associated with the additional video;

updating, by the hosting system, the ranking of the second plurality of words included in the list based on the word frequency profile;

responsive to updating the ranking, forming, by the hosting system, a search query that includes a number of words selected from the list, each selected word selected based on the associated ranking;

processing, by the hosting system, the search query to obtain a first set of search results comprising a number of related videos;

responsive to the number of related videos in the first set being less than a first threshold, modifying, by the hosting system, the search query by removing at least one word from the search query without replacing the removed word, and processing the modified search query to obtain a second set of search results; and responsive to the number of related videos in the first set being greater than the first threshold, providing, by the hosting system to the computer system, the first set as the related videos for the additional video.

* * * * *